(12) United States Patent
Jamadagni et al.

(10) Patent No.: US 11,076,199 B2
(45) Date of Patent: Jul. 27, 2021

(54) SYSTEMS AND METHODS FOR PROVIDING TARGETED CONTENT IN AN EMBMS STREAM TO A USER DEVICE

(71) Applicant: RELIANCE JIO INFOCOMM LIMITED, Mumbai-Maharashtra (IN)

(72) Inventors: Satish Nanjunda Swamy Jamadagni, Karnataka (IN); Pankaj Arun Pophaly, Maharashtra (IN)

(73) Assignee: RELIANCE JIO INFOCOMM LIMITED, Mumbai-Maharashtra (IN)

( * ) Notice: Subject to any disclaimer, the term of this patent is extended or adjusted under 35 U.S.C. 154(b) by 49 days.

(21) Appl. No.: 16/335,323

(22) PCT Filed: Sep. 26, 2017

(86) PCT No.: PCT/IB2017/055826
§ 371 (c)(1),
(2) Date: Mar. 21, 2019

(87) PCT Pub. No.: WO2018/060839
PCT Pub. Date: Apr. 5, 2018

(65) Prior Publication Data
US 2019/0281345 A1    Sep. 12, 2019

(30) Foreign Application Priority Data
Sep. 29, 2016 (IN) .............................. 201621033251

(51) Int. Cl.
*H04N 21/234* (2011.01)
*H04N 21/431* (2011.01)
(Continued)

(52) U.S. Cl.
CPC ......... *H04N 21/4316* (2013.01); *G06F 16/00* (2019.01); *G06Q 30/0241* (2013.01);
(Continued)

(58) Field of Classification Search
CPC ................... H04N 21/23418; H04N 21/23424
See application file for complete search history.

(56) References Cited

U.S. PATENT DOCUMENTS

| 2008/0263583 | A1* | 10/2008 | Heath | ................... G06Q 30/02 725/32 |
| 2015/0269629 | A1* | 9/2015 | Lo | ..................... H04N 21/85406 705/14.66 |
| 2017/0026672 | A1* | 1/2017 | Dacus | ................ G06Q 30/0233 |

FOREIGN PATENT DOCUMENTS

WO    2015148513 A1    10/2015

* cited by examiner

*Primary Examiner* — Hsiungfei Peng
*Assistant Examiner* — Fred Peng
(74) *Attorney, Agent, or Firm* — Hunton Andrews Kurth LLP (57) ABSTRACT

Embodiments of the present disclosure relate to systems [100, 200, 300] and methods for providing targeted content in an eMBMS stream to a user device [130], wherein the systems [100, 200, 300] and the methods [400, 500] may be implemented through one a server [110] and a user device [130]. The method, in an embodiment, may comprise: receiving a request from the user device for availing the eMBMS stream; receiving a profile information from the user device; generating at least one context tag based on the profile information; screening the at least one portion of the eMBMS stream to identify at least one object; identifying and transmitting at least one content based on at least one of the profile information and the at least one context tag; and enabling the at the user device to exhibit the at least one content.

18 Claims, 9 Drawing Sheets

(51) Int. Cl.
*H04N 21/81* (2011.01)
*G06Q 30/02* (2012.01)
*G06F 16/00* (2019.01)
*H04N 21/258* (2011.01)
*H04L 29/08* (2006.01)
*H04N 21/845* (2011.01)
*H04N 21/658* (2011.01)
*H04N 21/262* (2011.01)
*H04N 21/239* (2011.01)
*H04L 12/18* (2006.01)

(52) U.S. Cl.
CPC .......... *H04L 12/1859* (2013.01); *H04L 67/20* (2013.01); *H04L 67/306* (2013.01); *H04N 21/2393* (2013.01); *H04N 21/23418* (2013.01); *H04N 21/25841* (2013.01); *H04N 21/25883* (2013.01); *H04N 21/25891* (2013.01); *H04N 21/26258* (2013.01); *H04N 21/6582* (2013.01); *H04N 21/812* (2013.01); *H04N 21/814* (2013.01); *H04N 21/8456* (2013.01)

SYSTEMS AND METHODS FOR PROVIDING TARGETED CONTENT IN AN EMBMS STREAM TO A USER DEVICE

TECHNICAL FIELD

Embodiments of the present disclosure generally relate to advertisement in evolved multimedia broadcast multicast services (referred hereinafter as eMBMS). More particularly, embodiments of the present disclosure relate to targeted advertisement services over an eMBMS channel.

BACKGROUND

With a transverse and spur-of-the-moment demand of video content across the world, a high quality and seamless broadcast of such video content to a user, are a need of the hour while compared with the bequest generation. Due to a larger social acceptance and adoption of smartphones and tablets, the subscriptions for data consumption devices have grown multi-fold over the past few past years while mobile data traffic is expected to grow tenfold in another few years, driven mainly by video content through broadcast services, such as eMBMS, of the long-term evolution (referred hereinafter as LTE) network.

Since the LTE broadcast enables multiple users to receive the same content simultaneously, there is a huge market for advertisement to be embedded in the same content delivery suite. The LTE broadcast can deliver the same content to multiple users with the capability to support a virtually unlimited number of users simultaneously, thereby maintaining an efficient use of spectrum and network investments.

At the moment, the advertisements shown to the users on a webpage, are interactive multimedia advertisements comprising one or more text, graphics, animation, video, audio, and virtual object media that include at least one link to a new webpage that is displayed in the streamed area when selected by the user. The advertising on webpage may be a static or a dynamic. The static web advertising operates by displaying an advertisement image at a fixed location on the webpage displayed to the user. The advertisement image may be the link which is when selected by the user, displays the new webpage that conveys additional information about the product or service featured in the static advertisement. The advertisement image link generally disappears when selected by the user, and is replaced on the screen by the new webpage. Whereas the dynamic web advertising operates by displaying a sequence of advertisements. The dynamic web advertising is implemented using proprietary, stand-alone advertiser software that must be downloaded to a user's client and executed by the user. Although, like the static advertisement, the dynamic advertisement may also be a link, is displayed at a fixed location on the webpage, and generally disappears after the dynamic advertisement has been selected and replaced by the new webpage.

Further, an advertisement orchestrator typically uses some intelligent mechanism, such as data-mining assisted by a deep-packet Inspection, to plan, execute, and achieve targeted advertising campaigns across multiple channels. The advertisement broker interfaces enable cellular operator to publish suitable slots and other key tags and source advertisements. Moreover, the eMBMS channel can be used for disseminating advertisement of all kinds including commercial information as well as effectuating electronic commerce i.e. the process of buying and selling of goods and services.

Although there exist various methods of providing such targeted advertisements to the user; however, facilitating advertisements over the LTE eMBMS channel is still being discussed in many technical forums due to various shortcomings and problems associated with the existing techniques. In this effort, new advancements towards the solution have been conceptualized and reduced in reality e.g. the DASH (Dynamic Adaptive Streaming over HTTP) industry forum interoperability report provides basic reference architecture for supporting advertisements over the eMBMS; however, the DASH architecture provides a very rudimentary architecture reference for advertisement insertion and does not provide reference points for innovative advertisement revenue opportunities. The existing techniques in the current scenarios of the DASH-IF specification provide timeslots for advertisement insertion; however, such existing techniques fail to either provide an additional mechanism to facilitate targeted advertisement or facilitate the real-time purchase of items tagged in a live video stream.

In the existing solutions, there exists no mechanism where the eMBMS service can enable advertisement features for targeted advertising over the eMBMS channel. Also, there are no mechanisms for e-commerce on the eMBMS service where user device can enable a purchase mechanism identified by a user action on an eMBMS segment being played out thus, enabling eMBMS ecommerce channel.

Having said that and in view of the aforementioned shortcomings, enigma and drawbacks inherent in the existing techniques, there exists unembellished needs for an improved and enhanced mechanism to facilitate targeted and content specific advertisement to the user. Further, there exists requirement to propose a system and method for facilitating targeted advertisement, which not only considers the targeted user and related attributes, but also provides selective advertisement on the basis of the appearance of the content in the eMBMS stream/content. Furthermore, there exists requirement to propose a system for facilitating real-time purchase of items/goods tagged in the live stream eMBMS service.

SUMMARY

This section is provided to introduce certain aspects of the present disclosure in a simplified form that are further described below in the detailed description. This summary is not intended to identify the key features or the scope of the claimed subject matter.

Embodiments of the present disclosure may relate to a server for providing at least one content in an eMBMS stream to a user device, the server comprising: a receiver module configured to: receive a request from the user device for availing the eMBMS stream, wherein the eMBMS stream has at least one stream portion, and receive a profile information from the user device, wherein the profile information corresponds to a user; a media presentation description module configured to: generate at least one context tag based on the profile information, and screening the at least one portion of the eMBMS stream to identify at least one object, wherein the at least one content is tagged with the at least one object, and the at least one object corresponds to at least one portion of the eMBMS stream; and a transmitter module configured to: transmit the at least one content based on at least one of the profile information and the at least one context tag, and enable the at the user device to exhibit the at least one content, wherein the at least one content is exhibited during the at least one portion of the eMBMS stream.

Embodiments of the present disclosure may relate to a method for providing at least one content in an eMBMS stream to a user device, the method being performed by a server, the method comprising: receiving a request from the user device for availing the eMBMS stream, wherein the eMBMS stream has at least one stream portion; receiving a profile information from the user device, wherein the profile information corresponds to a user; generating at least one context tag based on the profile information; screening the at least one portion of the eMBMS stream to identify at least one object, wherein the at least one content is tagged with the at least one object, and the at least one object corresponds to at least one portion of the eMBMS stream; identifying and transmitting at least one content based on at least one of the profile information and the at least one context tag; and enabling the at the user device to exhibit the at least one content, wherein the at least one content is exhibited during the at least one portion of the eMBMS stream.

Embodiments of the present disclosure may relate to a user device [130] for providing at least one content in an eMBMS stream to a user device, the user device [130] comprising: a transmitter module configured to: transmit a request to a server for availing the eMBMS stream, wherein the eMBMS stream has at least one stream portion; an advertisement management module configured to: generate at least one context tag based on a profile information, wherein the profile information corresponds to a user, and the transmitter module transmits the at least one of at least one context tag and the profile information to the server; and a receiver module configured to: receive the at least one content from the server based on at least one of the at least one context tag and the profile information, wherein the at least one content is tagged with the at least one object, and the at least one object corresponds to at least one portion of the eMBMS stream, wherein the advertisement management module exhibits the at least one content, wherein the at least one content is exhibited during the at least one portion of the eMBMS stream.

Embodiments of the present disclosure may relate to a method of providing at least one content in an eMBMS stream to a user device, the method being performed by the user device, the method comprising: transmitting a request to a server for availing the eMBMS stream, wherein the eMBMS stream has at least one stream portion; generating at least one context tag based on a profile information, wherein the profile information corresponds to a user; transmitting at least one of the at least one context tag and the profile information to the server; receiving the at least one content from the server, wherein the at least one content is identified based on at least one of the at least one context tag and the profile information, the at least one content is tagged with the at least one object, and the at least one object corresponds to at least one portion of the eMBMS stream; and exhibiting the at least one content, wherein the at least one content is exhibited during the at least one portion of the eMBMS stream.

DESCRIPTION OF THE DRAWINGS

The accompanying drawings, which are incorporated herein, and constitute a part of this disclosure, illustrate exemplary embodiments of the disclosed methods and systems in which like reference numerals refer to the same parts throughout the different drawings. Components in the drawings are not necessarily to scale, emphasis instead being placed upon clearly illustrating the principles of the present disclosure. Also, the embodiments shown in the figures are not to be construed as limiting the disclosure, but the possible variants of the method and system according to the disclosure are illustrated herein to highlight the advantages of the disclosure. It will be appreciated by those skilled in the art that disclosure of such drawings includes disclosure of electrical components or circuitry commonly used to implement such components.

DETAILED DESCRIPTION

In the following description, for the purposes of explanation, various specific details are set forth in order to provide a thorough understanding of embodiments of the present disclosure. It will be apparent, however, that embodiments of the present disclosure may be practiced without these specific details. Several features described hereafter can each be used independently of one another or with any combination of other features. An individual feature may not address any of the problems discussed above or might address only one of the problems discussed above. Some of the problems discussed above might not be fully addressed by any of the features described herein. Example embodiments of the present disclosure are described below, as illustrated in various drawings in which like reference numerals refer to the same parts throughout the different drawings.

The present disclosure encompasses systems and methods for providing targeted content in an eMBMS stream to a user device, wherein the user device is associated with a user. The system is configured to tag advertisement contents in an eMBMS stream, wherein the advertisement contents are tagged on the eMBMS stream either in real-time or in advance i.e. prior to broadcasting the eMBMS stream. Further, the eMBMS along with the advertisement content are provided to the user selectively and/or to a targeted user based on various information such as geographic location of the user and the subscription information associated with the user subscription. Furthermore, the present disclosure a system and a method for providing a link and/or address of the advertisement content to purchase a good/item tagged with the advertisement content while streaming the eMBMS content. Moreover, the system and a method for providing selective and/or a targeted advertisement contents may be implemented through one of a server [110] based approach and a user device based approach.

The "eMBMS stream" as used herein may relate to at least one of a pre-stored video stream and a live stream.

The "advertisement content"/"at least one content" as used herein may refer to an advertisement corresponding to the at least one object and a direct link to purchase an item corresponding to the at least one object.

The at least "object", as used herein, may relate to at least one of an attire worn by a character, an article, and a location displayed during the at least one portion of the eMBMS stream.

Figure 1:
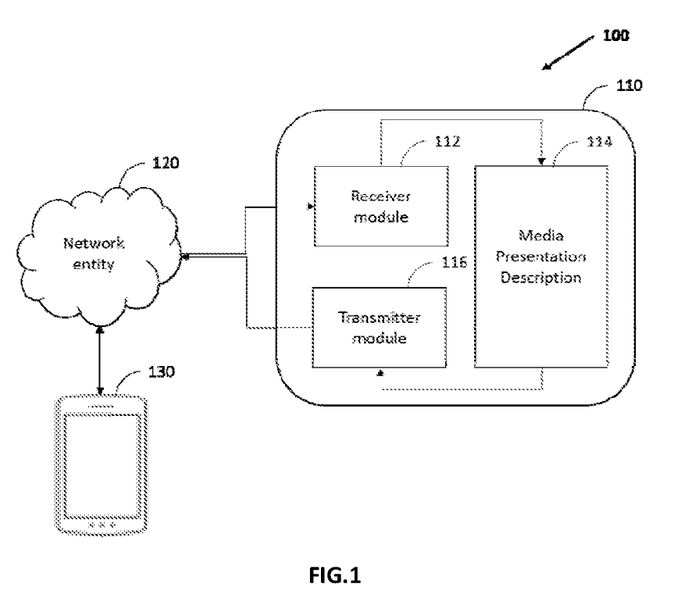
FIG. 1 illustrates a simplified block diagram of the present system [100] for providing targeted content in an eMBMS stream to a user device [130], wherein the system [100] is implemented in a server [110], in accordance with an embodiment of the present disclosure.

FIG. 1 illustrates a simplified block diagram of the present system [100] for providing targeted content in an eMBMS stream to a user device [130], wherein the system [100] is implemented in a server [110]. The system [100] comprises the server [110], the user device [130], and a network entity [120]. Further, the server [110] comprises a receiver module [112], a media presentation description (referred hereinafter as MPD) module [114] and a transmitter module [116].

The user device [130] is configured to transmit a request for availing the eMBMS stream, wherein the request includes at least one of a user device [130] identifier and a user identifier. The user device [130] may further maintain a profile information for a user associated with the user device [130]. The profile information includes at least one of a name of the user, a geographic location information of the user, a country, a date of birth of the user, a preference of the user, a gender of the user, a previous usage history, a shopping history of the user, a history of frequently visited locations, a history of application usage and any such information that is obvious to a person skilled in the art.

The "profile information", as used herein, may relate to at least one of a name of the user, a geographic location information of the user, a date of birth of the user, a preference of the user, a gender of the user, a previous usage history, a shopping history of the user, a history of frequently visited locations, a history of application usage and any such information that is obvious to a person skilled in the art.

The "network entity", as used herein, may relate to one or more components of a cellular network. Such components include, but not limited to, a home server, a gateway to which the user device [130] is connected, an IP multimedia subsystem network, and a long-term evolution (LTE) network.

The receiver module [112] is configured to receive the request from the user device [130] for availing the eMBMS stream and receive the profile information from the user device [130]. Moreover, the eMBMS stream has at least one stream portion occurring in a sequence and expressed in time of occurrence. Such the eMBMS stream may be one of a pre-stored video stream and a live video stream. The receiver module [112] is further configured to transmit the request to the MPD module [114]. The at least one portion of the eMBMS stream, as used herein, may be expressed in time of occurrence in the eMBMS stream.

The MPD module [108], pursuant to receiving the request from the receiver module [112], may generate at least one context tag based on the profile information received from the user device [130]. The at least one context tag is generated by scanning the profile information to tag the profile information. For an instance, the user device [130] transmits the profile information to the receiver module [112] such as "name", "Date of Birth (DOB)", "geographic location information", "country" and "gender" of the user. Thereafter, the MPD module [108] may generate tags corresponding to "name", "Date of Birth (DOB)", "geographic location information", "country" and "gender" of the user, based on the profile information received from the receiver module [112]. Alternatively, the tags may be generated based on analytics and a deduction based on the previous usage history at the server side.

Further, the MPD module [108] may screen the at least one portion of the eMBMS stream to identify at least one object, wherein the at least one object identified may correspond to at least one portion of the eMBMS stream. Thereafter, the at least one content is identified for transmitting to the user, wherein the at least one content also corresponds to the at least one object.

The transmitter module [116] is configured to transmit at least one content based on at least one of the profile information and the at least one context tag, wherein the at least one content is identified/filtered by the MPD module [114] of the server. Further, in an event the at least one content is transmitted by the transmitter module [116], the at least one content is applied selectively at the user device [130] to exhibit along the eMBMS stream i.e. the at least one content is exhibited during the at least one portion of the eMBMS stream.

In an exemplary scenario, one or more targeted advertisement is required to be transmitted along an eMBMS stream to the user based on the profile information and geographic information, wherein the eMBMS stream is divided into segments of T1, T2, T3, T4 and T5. Further, as a pre-requisite/pre-configuration, the one or more advertisement has at least one associated tag such depicted in the table below:

| Advertisement | Content | Tags |
| --- | --- | --- |
| Ad 1 | A video/GIF: Showing a player wearing a blue jersey. A Link: to Purchase the Blue Jersey | #BlueJersey, #Jersey |
| Ad 2 | A video/GIF: a rider wearing a black jacket A Link: to Purchase the black jacket | #BlackJacket, #Jacket |
| Ad 3 | A video/GIF: A player wearing a white jersey playing with a bat A Link: to Purchase the Bat | #Bat |

Thereafter, the segments of the eMBMS stream are screened to identify at least one object/item, wherein each of the objects may have associated context tags, as illustrated in the below table:

| eMBMS stream Segment | Content | Object identified | Context tags |
| --- | --- | --- | --- |
| T1 | a player wearing a jersey playing with a bat | A Jersey and a Bat | #Bat, #Jersey |
| T2 | a rider wearing a black jacket riding a black bike | Black Jacket and a Bike | #BlackJacket, #Jacket, Bike, #BlackBike |
| T3 | a rider wearing a black jacket riding a black bike | Black Jacket and a Bike | #BlackJacket, #Jacket, Bike, #BlackBike |
| T4 | a singer singing with a yellow guitar | A Yellow Guitar | #Guitar #YellowGuitar |
| T5 | a player wearing a jersey playing with a bat | A Bat and a Jersey | #Bat, #Jersey |

Subsequently, each of the segment of the eMBMS stream is tagged with context tags such as a jersey and a bat for the T1 & T5 segments; black jacket and a bike for the T2&T3 segments, a yellow guitar for the T4 segment. Thereafter, filtering the advertisement to be transmitted based on a mapping of the tags corresponding to the advertisement with the context tags corresponding to the segments of the eMBMS stream which is further applied at the user device [130] while exhibiting the eMBMS stream, as depicted in the below table:

| eMBMS segments | Content | Advertisement |
| --- | --- | --- |
| T1 | a player wearing a jersey playing with a bat | Ad 1 and Ad 3 |
| T2 | a rider wearing a black jacket riding a black bike | Ad 2 |
| T3 | a rider wearing a black jacket riding a black bike | Ad 2 |
| T4 | a singer singing with a yellow guitar | No Add will be displayed (Since no matching advertisement tag exists for this context tag) |
| T5 | a player wearing a jersey playing with a bat | Ad 1 and Ad 3 |

Figure 1A:
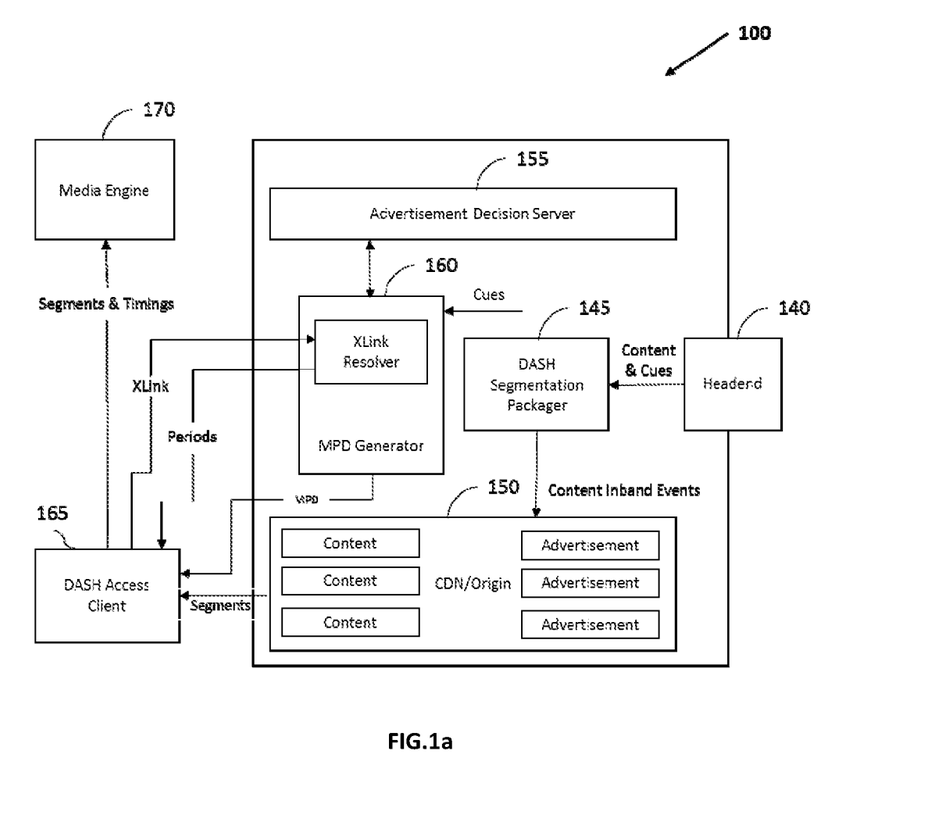
FIG. 1a illustrates a detailed architecture of the present system [100] for providing targeted content in an eMBMS stream to a user device [130], wherein the system [100] is implemented through a server [110], in accordance with an embodiment of the present disclosure.

Further, the content/advertisement may be restricted for transmission/exhibition to the user device [130] based on profile information. For instance, a content/advertisement categorized for the users aging more than 18 years, whereas, the user profile information corresponds to an age of 16 years of the user, and hence, the content/advertisement may be restricted for the user. The at least one the advertisement may further comprise a direct link/file for purchase of a related good/item, wherein the direct link for purchase of a related good/item may be exhibited using one of an indication, a dialogue box, a banner, a pop-up, and a textual message. FIG. 1a illustrates a detailed architecture of the present system [100] for providing targeted content in an eMBMS stream to a user device [130], wherein the system [100] is implemented through a server [110]. The system [100] comprises a media engine [170], a DASH access client [165], an advertisement decision server [155], a MPD generator [160], a CDN/origin module [150], a DASH segmentation packager [145] and a headend [140]. Further, the MPD generator [160] comprises a Xlink resolver.

The "headend [140]" as used herein may be configured to receive the eMBMS stream which is processed by the "DASH segmentation packager [145]" for storing at the CDN/origin module [150]. Therefore, the "CDN/origin module [150]" as used herein may be configured to store the eMBMS stream and the advertisement content for dispensing/transmitting to the DASH access client [165], wherein the eMBMS stream and the advertisement content may be dispensed in form of segments.

The "advertisement decision server [155]" as used herein may be configured to decide all the advertisement content which need to transmitted/played/exhibited to a user in which duration of eMBMS stream, and may be expressed in form of a que/period information, wherein the advertisement content which need to be transmitted/played/exhibited to the user may be decided based on a context tags, a profile information and a combination thereof, maintained at the advertisement decision server [155].

The "Media Presentation Description generator [160] or MPD generator [160]" as used herein may be configured to express all advertisement content related information, wherein at least one advertisement content and related decisions are triggered by a request received from the user device [130]. The advertisement content related decisions may be taken by the MPD generator [160] based on the advertisement content and the period on which the advertisement content belongs. All the data such as profile information and context tags needed to trigger the advertisement decision is maintained at the MPD generator [160]. Further, the MPD generator [160] defines the time gaps which may be used for insertion of the advertisement content by the CDN/origin module [150] of the server [110].

The "DASH access client [165]" as used herein may be configured to receive the segments from the CDN/origin module [150], the que/period information from the advertisement decision server [155], and the MPD format from the MPD generator [160]. Further, the DASH access client [165] may be configured to decode the segments received from the CDN/origin module [150], the que/period information from the advertisement decision server [155] and the MPD format from the MPD generator [160], for passing the same to the media engine [170]. The "media engine [170]" as used herein may be configured to apply the segment, the que/period information along with the MPD format for playing/exhibiting the advertisement content at one or more defined interval of the eMBMS stream based on the MPD format and the quo/period information.

Figure 1B:
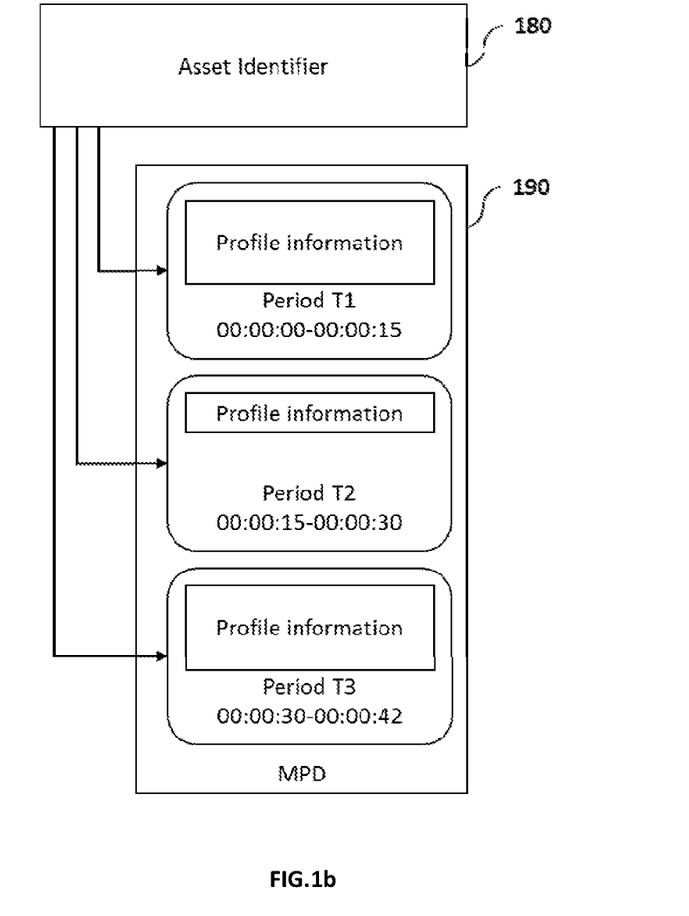
FIG. 1b illustrates an exemplary embodiment of the MPD format [190], in accordance with the present disclosure.
Figure 1C:
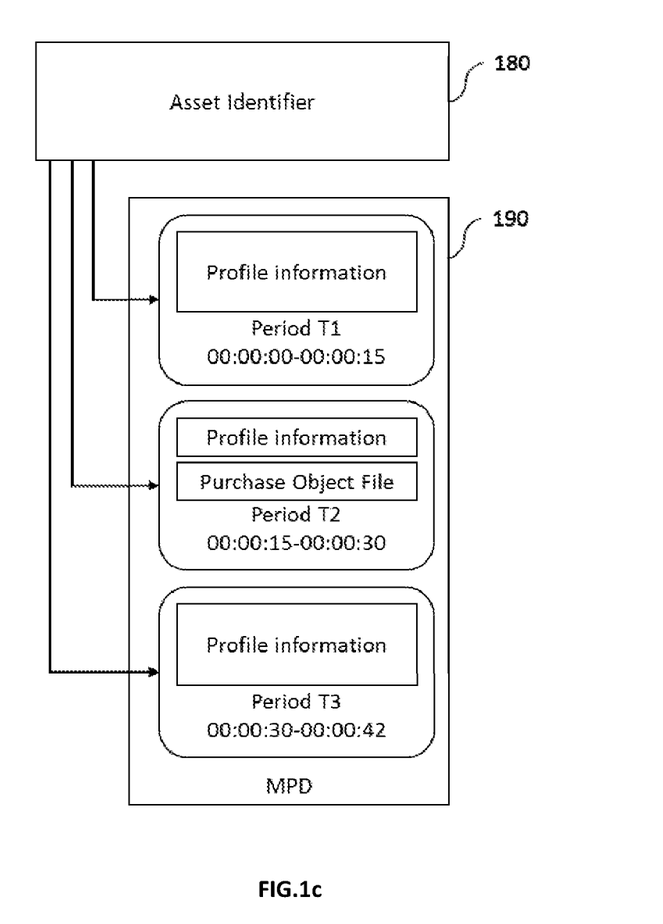
FIG. 1c illustrates an exemplary embodiment of the MPD format [190] with purchase object file embedded, in accordance with the present disclosure.

FIG. 1b illustrates, an exemplary embodiment of the MPD format [190], in accordance with the present disclosure. The MPD format [190] may consist of a period (T1, T2, T3) on which an advertisement content may belong in an eMBMS stream along with the profile information, the context tag, and a combination thereof. The asset identifier [180] may be configured to identify the content of MPD format based on the profile information, the context tag, and a combination thereof. Further, as illustrated in FIG. 1c, the present disclosure encompasses a MPD format [190] that may have additional "purchase object file" having one or more links/objects/macro that correspond to and/or direct to a purchase redirection for the user. The purchase object file may appear to the user as one of a banner, a pop-up, and a notification tag, clicking/touching the purchase object file may direct the user to one or more retailer portal or open a pre-installed application or may open a macro app which allows the user to purchase and make a payment for the item/good associated with purchase object file on-the-fly with while streaming the eMBMS stream.

Moreover, the present disclosure encompasses an enhanced eMBMS advertisement insertion mechanism in which a machine generated data may be sent using said mechanism. In an embodiment, a machine to machine (M2M) or the machine type communication (MTC) server

[110] may transmit data as an advertisement insertion via an inter working function (IWF) into a BM-SC to be consumed by the user devices [130]. A MTC (Machine Type Communication data tag) data tag is identified in the MPD format along with a MTC group identifier for enabling the MTC communication via the eMBMS channel.

In an embodiment, a service operator may use the CDN module as an advertisement content insertion/orchestration point instead of a BM-SC or an eMBMS Gateway. In an event the service operator owns the content of the eMBMS stream content, the insert of the advertisement content is easier since the content of the eMBMS stream is known, alternatively, the same is achieved using extract key tags about the nature of the eMBMS stream/broadcast content to draw appropriate advertisement content and insert the same into the eMBMS stream. An eMBMS DASH transport indicator and other cues could be used as tags insert the advertisement content.

Further, the system [100] encompasses the MDG generator module for providing a multi profiling MPD format which may be selectively applied based on the intended target i.e. the user device [130] having an associated user profile by the eMBMS middleware/clients, wherein the multi profiling MPD format may have IDs of the intended user device [130]. Further, the multi profile MPD may be configured to apply the right advertisement content based on processing the geographic and/or other contextual tags that helps the eMBMS middleware/client.

In sequence, as an example, the advertisement decision server [155] entity collects the at least one of "user context" and the profile information based on one of the mechanisms such as history of the user subscription to media content type etc. Subsequently, the advertisement decision server [155] shares this "user context" information to the MPD generator [160] for generating the MPD format based on the "user profile information" and the "context tags" for which the advertisement content would be applicable. Thereafter, the DASH access client [165] entity may check if the advertisement content provided against a "user profile information" maps on to a "user profile" and accordingly applies the advertisement content alongside the eMBMS stream. However, if the context tags and/or the profile information is found to be irrelevant, the advertisement content is not played/exhibited along with eMBMS stream.

Figure 2:
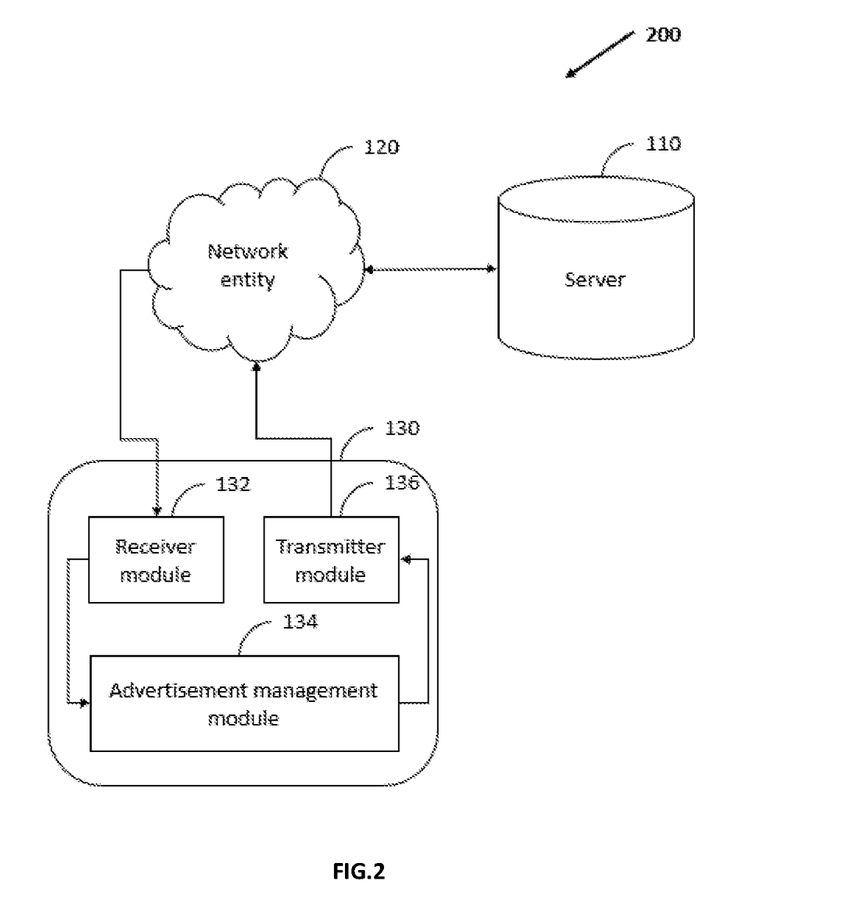
FIG. 2 illustrates a simplified block diagram of the present system [200] for providing targeted content in an eMBMS stream to a user device [130], wherein the system [100] is implemented in a user device [130], in accordance with an embodiment of the present disclosure.

FIG. 2 illustrates a simplified block diagram of the present system [200] for providing targeted content in an eMBMS stream to a user device [130], wherein the system [100] is implemented in a user device [130]. The system [100] comprises the server [110], the user device [130], a network entity [120]. Further, user device [130] comprises a receiver module [132], an advertisement management module [134] and a transmitter module [136].

The transmitter module [136] of the system [200] is configured to transmit a request to a server [110] for availing the eMBMS stream, wherein the eMBMS stream has at least one stream portion. The transmitter module [136] may comprise at least one transmitter and/or plurality of software modules, which may be expressed in the form of a hardware, a software and a combination thereof.

The advertisement management module [134] of the system [200] may be configured to generate at least one context tag based on a profile information, wherein the profile information corresponds to a user, and the transmitter module [136] transmits the at least one of at least one context tag and the profile information to the server. Further, the advertisement management module [134] may be configured to generate one context tag based on analytics data related to previous usage history, pattern, shopping profile of the user.

The receiver module [132] of the system [200] may configured to receive the at least one content from the server [110] based on at least one of the at least one context tag and the profile information, wherein the at least one content is tagged with the at least one object, and the at least one object corresponds to at least one portion of the eMBMS stream, wherein the advertisement management module [134] exhibits the at least one content. Further, the at least one content may be exhibited during the at least one portion of the eMBMS stream.

Figure 2A:
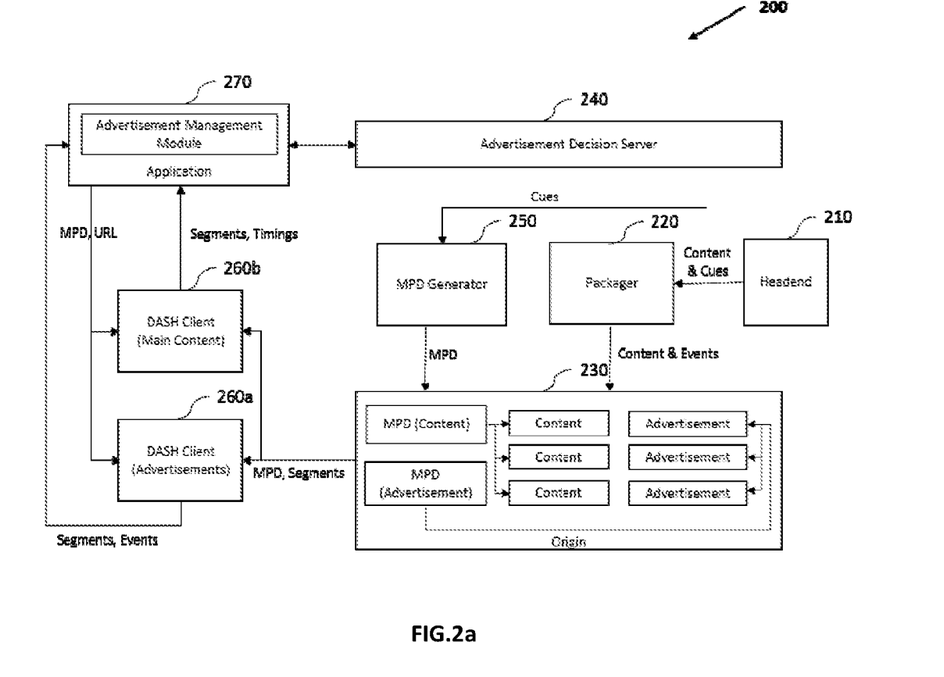
FIG. 2a illustrates a detailed architecture of the present system [200] for providing targeted content in an eMBMS stream to a user device [130], wherein the system [200] is implemented through the user device [130], in accordance with an embodiment of the present disclosure.

FIG. 2a illustrates a detailed architecture of the present system [200] for providing targeted content in an eMBMS stream to a user device [130], wherein the system [200] is implemented through the user device [130]. The system [200] comprises A headend [210], a dash segment packager [220], a CDN/origin module [230], an advertisement decision server [240], a MPD generator [250], DASH clients [260a, 260b], and an advertisement management module [270].

The "headend [210]" as used herein may be configured to receive the eMBMS stream which is processed by the "DASH segmentation packager [220]" for storing at the CDN/origin module [230]. Therefore, the "CDN/origin module [230]" as used herein may be configured to store the eMBMS stream and the advertisement content for dispensing/transmitting to the DASH clients [260a, 260b], wherein the eMBMS stream and the advertisement content may be dispensed in form of segments.

The "advertisement decision server [240]" as used herein may be configured to decide all the advertisement content which need to transmitted/played/exhibited to a user in which duration of eMBMS stream, and may be expressed in form of a que/period information, wherein the advertisement content which need to be transmitted/played/exhibited to the user may be decided based on a context tags, a profile information and a combination thereof, received from the advertisement management module [270].

The "Media Presentation Description generator [250] or MPD generator [250]" as used herein may be configured to express all advertisement content related information, wherein at least one advertisement content and related decisions are triggered by a request received from the user device [130]. The advertisement content related decisions may be taken by the MPD generator [250] based on the advertisement content and the period on which the advertisement content belongs. All the data such as profile information and context tags needed to trigger the advertisement decision is maintained at the MPD generator [250].

Further, the MPD generator [250] defines the time gaps which may be used for insertion of the advertisement content by the CDN/origin module [230] of the server [110].

The "DASH client [165]" as used herein may be configured to receive the segments from the CDN/origin module [230], the que/period information from the advertisement decision server [240], and the MPD format from the MPD generator [250]. Further, the DASH clients [260a, 260b] may be configured to decode the segments received from the CDN/origin module [230], the que/period information from the advertisement decision server [240] and the MPD format from the MPD generator [250], for passing the same to the advertisement management module [270].

The "advertisement management module [270]" as used herein may be configured to apply the segment, the que/period information along with the MPD format for playing/ exhibiting the advertisement content at one or more defined interval of the eMBMS stream based on the MPD format and the quo/period information.

In sequence, as an example, the advertisement management module of the user device [130] collects the profile information based on type of eMBMS stream, a historic information and/or subscription related information of the user. Subsequently, the advertisement management module shares the "user context" and the user profile information to the advertisement decision server [155] which in turn shares this "user context" information to the MPD generator [160] for creating an MPD format based on the "user profile information" and the "context cues" for which the advertisement content would be applicable. Thereafter, the DASH Client may check if the advertisement segment provided against a "user profile information" maps on to the "user profile" and/or the context and accordingly applies the advertisement content alongside the eMBMS stream. However, if the context and/or the profile information is found to be irrelevant, the advertisement content is not played/exhibited along with eMBMS stream. The present disclosure further encompasses a dynamic MPD modification mechanism for facilitating the specification of an eMBMS stream compression ratios for a duration of the advertisement content insertion. The mechanism infuses the advertisement management module to advance the user context and profile information to the MPD generator [160]. The advertisement management module also picks a size, a compression ratio of the advertisement content for providing the same to the MPD generator [160]. Subsequently, the MPD generator [160] creates an MPD based on a computed exhibition/play time, the "User Profile information" and the "context cues" for the compression ratio of the advertisement content. Thereafter, the DASH client may check if the advertisement content provided against a "user profile information" maps on to the "user profile" and/or the context and applies the advertisement content accordingly. Further, the playout time of the segment is computed only if the compression ratio is provided, alternatively, the MPD may provide/defines a time period/duration for which the advertisement content may play in the eMBMS stream.

The present disclosure a tagging mechanism for eMBMS streams to facilitate interactive commerce, the mechanism involves identifying one or more objects in an eMBMS stream, identifying segments of eMBMS stream and associating a link for the identified objects, wherein the link may correspond to a direct link for immediate purchase of the same good or a good similar in nature/property of the identified goods. Further, the link may be provided and/or availed by a marco app or a portal/browser residing on the user device [130] where the link is played/exhibited.

In one embodiment, the present disclosure encompasses defining periods in an MPD having an associated purchase object file, therefore, in an event the user clicks link on the user device [130], during such an advertisement content play out period, the associated "purchase object file" is passed to the DASH player for rendering alongside the eMBMS stream. The user may in turn get involved in an online purchase activity by way of clicking on the object in the object file that has been rendered.

The mechanism involves, the advertisement management module to shares the "user context" and profile information to the MPD generator [160]. Further, the advertisement management module indicates the MPD generator [160] if an advertisement content and/or the eMBMS stream has a "commercial purchase entity" tags. The MPD generator [160] creates an MPD format based on the "user profile information", the "context cues" and the "commercial purchase entity" tag. Further, the DASH client may check if the advertisement content is relevant based on the "user profile information". In case the advertisement content, DASH client may identify if the advertisement content and/or the eMBMS stream has a "commercial purchase file" tag and subsequently parses the MPEG-7 "content description interface" and publishes the same to a user device [130] as an object open for purchase. In case, the user clicks on such a "content description", the DASH client sends an xlink to the xlink resolver to display the purchase object in a separate "tab". Subsequently, the user may proceed to purchase the object of interest.

In yet another embodiment, the MPD format may also contain flags to indicate if the MPD format has the regular MPD elements, the user profile/context tags and/or the compression ratio of the advertisement content, and the "purchase object" tags.

Figure 3:
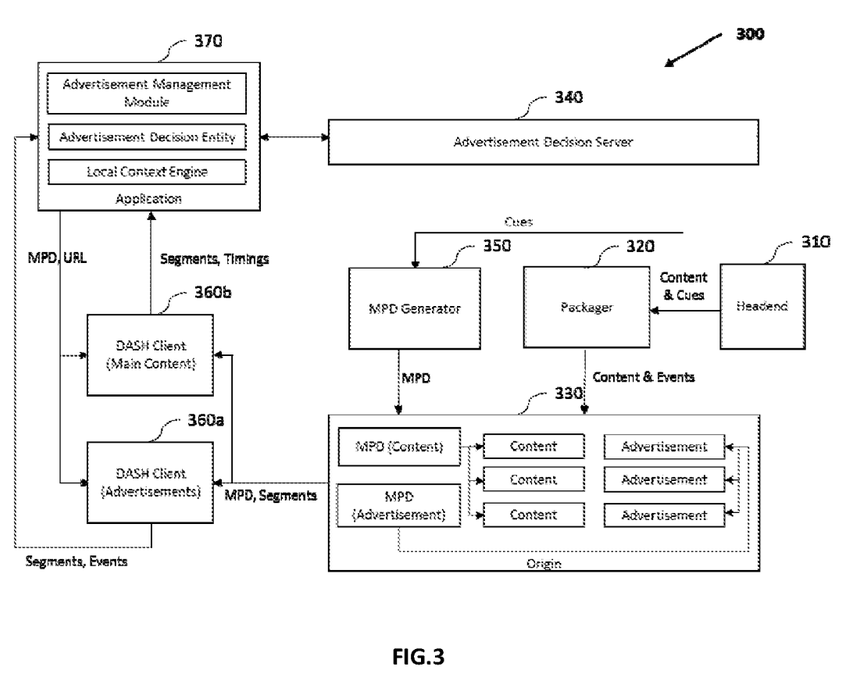
FIG. 3 illustrates a detailed architecture of a hybrid system [300] for providing targeted content in an eMBMS stream to a user device [130], wherein the hybrid system [200] is implemented through the user device [130].

FIG. 3 illustrates a detailed architecture of a hybrid system [300] for providing targeted content in an eMBMS stream to a user device [130], wherein the hybrid system [300] may be implemented through the user device [130]. The hybrid system [300] The system [200] comprises a headend [310], a dash segment packager [320], a CDN/origin module [330], an advertisement decision server [340], a MPD generator [350], DASH clients [360a, 360b], and an advertisement management module [370]. The advertisement management module [370] further comprises an advertisement decision entity and a local context engine.

In one embodiment, the advertisement management module may be configured at the user device [130] for interacting with the advertisement decision entity, wherein the advertisement decision entity may be assisted by the local context engine. The DASH clients [360a, 360b] receives manifest and eMBMS stream, with a cue/period information embedded in either one of the manifest and the eMBMS stream. Further, the cue/period information may be passed to the advertisement management module [370], which in turn contacts the advertisement decision server [340] for deciding the advertisement content based on the user device [130], the profile information and/or the user context data, wherein the profile information and/or the user context data may be maintained at the local context engine. In an event the advertisement content is found relevant, an information on content to be played/exhibited is received. At the user device [130], the advertisement management module [370] may share the "context" manifests with the advertisement decision entity and the advertisement decision server [370] to bias/filter the advertisement content to be received. This in turn, results in the MPD format for an inserted advertisement content and a splice time at which presentation of the eMBMS stream may be paused and presentation of the inserted content starts.

Figure 4:
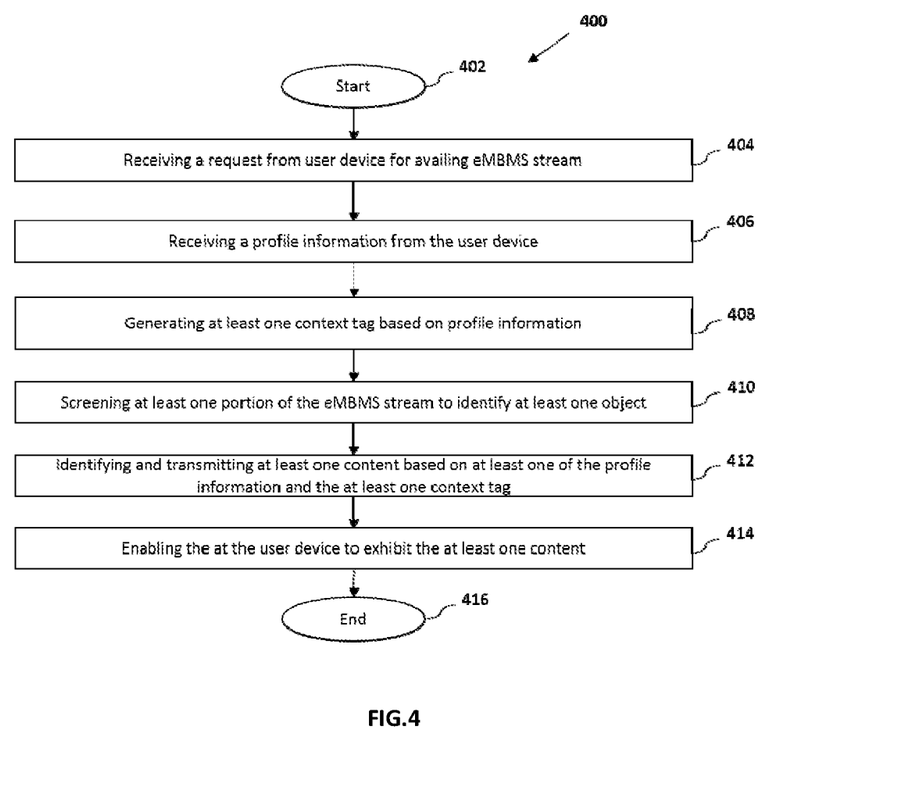
FIG. 4 illustrates an exemplary method flow diagram [400] for providing targeted content in an eMBMS stream to a user device [130], wherein the method being performed by a server.

FIG. 4 illustrates an exemplary method flow diagram [400] for providing targeted content in an eMBMS stream to a user device [130], wherein the method being performed by a server. The method flow initiates at step 402.

At step 404, a request is received from the user device [130] for availing the eMBMS stream, wherein the eMBMS stream has at least one stream portion.

At step 406, a profile information is received from the user device [130], wherein the profile information corresponds to a user.

At step 408, at least one context tag is generated based on the profile information.

At step 410, the at least one portion of the eMBMS stream is screened to identify at least one object, wherein the at least one content is tagged with the at least one object, and the at least one object corresponds to at least one portion of the eMBMS stream. The tagging of the at least one content with the at least one object is one of a pre-tagging and a real-time tagging i.e. the tagging of the at least one object on the at least one content is done before transiting the eMBMS stream or while transmitting the eMBMS stream.

At step 412, at least one content is identified and transmitted based on at least one of the profile information and the at least one context tag.

At step 414, at the user device [130] is configured/enabled to exhibit the at least one content, wherein the at least one content is exhibited during the at least one portion of the eMBMS stream. The method [400] terminates at step 416.

The method [400] further encompasses exhibiting the at least one content based on at least one a gaze and a behavior of the user detected by the user device [130]. The gaze and the behavior of the user may be detected by one or more sensor of and/or a camera of the user device [130].

Figure 5:
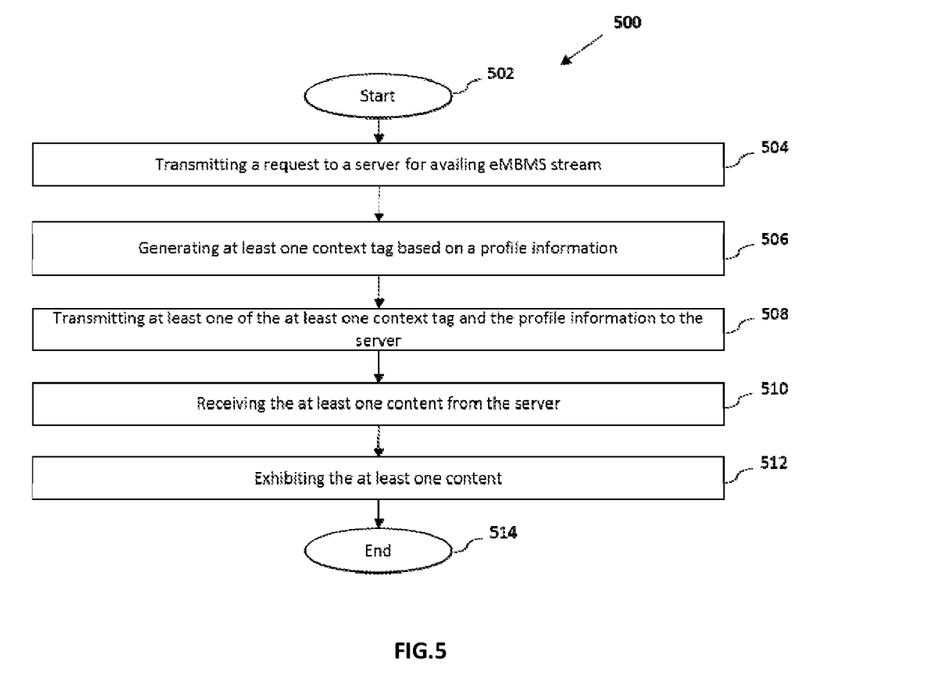
FIG. 5 illustrates an exemplary method flow diagram [500] for providing targeted content in an eMBMS stream to a user device [130], wherein the method being performed by a user device [130].

FIG. 5 illustrates an exemplary method flow diagram [500] for providing targeted content in an eMBMS stream to a user device [130], wherein the method being performed by a user device [130]. The method flow initiates at step 502.

At step 504, a request is transmitted to a server [110] for availing the eMBMS stream, wherein the eMBMS stream has at least one stream portion.

At step 506, at least one context tag is generated based on a profile information, wherein the profile information corresponds to a user.

At step 508, the at least one of at least one context tag and the profile information is transmitted to the server.

At step 510, the at least one content is received from the server, wherein the at least one content is identified based on at least one of the at least one context tag and the profile information. Further, the at least one content is tagged with the at least one object.

Furthermore, the at least one object corresponds to at least one portion of the eMBMS stream.

The at least one content is tagged either in real-time along transmitting the eMBMS stream or before transiting the eMBMS stream.

At step 512, the at least one content is exhibited to the user device [130], wherein the at least one content is exhibited during the at least one portion of the eMBMS stream. The method [500] terminates at step 514.

The method [500] further encompasses exhibiting the at least one content based on at least one a gaze and a behavior of the user detected by the user device [130]. The gaze and the behavior of the user may be detected by one or more sensor of and/or a camera of the user device [130].

The various entities of the system [100, 200, 300] may have one or more interfaces, module, and component depicted in the figures and described herein may be present in the form of a hardware, a software and a combination thereof. Connection shown between these components/module/interface in the system [100, 200, 300] are exemplary and any components/module/interface in the systems [100, 200, 300] may interact with each other through various logical links and/or physical links. Further, the components/modules/interfaces may be connected in other possible ways.

Though a limited number of the user device [130], the transmitter modules [112, 132], the receiver modules [116, 136] and components, have been shown in the figures; however, it will be appreciated by those skilled in the art that the overall system [100, 200, 300] of the present disclosure encompasses any number and varied types of the entities/elements such the user device [130], the transmitter modules [112, 132], the receiver modules [116, 136] and various interfaces, modules and components of the systems [100, 200, 300].

While considerable emphasis has been placed herein on the disclosed embodiments, it will be appreciated that many embodiments can be made and that many changes can be made to the embodiments without departing from the principles of the present disclosure. These and other changes in the embodiments of the present disclosure will be apparent to those skilled in the art, whereby it is to be understood that the foregoing descriptive matter to be implemented is illustrative and non-limiting.

We claim:

1. A method of providing at least one content in an eMBMS stream to a user device, the method being performed by a server, the method comprising:
   receiving a request, at a server, from a user device for availing an evolved multimedia broadcast multicast services (eMBMS) stream, wherein the eMBMS stream has at least one stream portion;
   receiving a profile information from the user device, wherein the profile information corresponds to a user;
   generating at least one context tag based on the profile information;
   screening the at least one portion of the eMBMS stream to identify at least one object,
   wherein
   the at least one content is tagged with the at least one object, and
   the at least one object corresponds to at least one portion of the eMBMS stream; identifying and transmitting at least one content based on at least one of the profile information and the at least one context tag; wherein the at least one content includes an advertisement corresponding to the at least one object and a direct link to purchase an item corresponding to the at least one object; wherein the direct link is configured to allow purchase of the item while streaming the eMBMS stream by causing one or more of a retailer portal a pre-installed application, or a macro application to open to allow for purchase and payment of the item; and
   enabling the at the user device to exhibit the at least one content, wherein the at least one content is exhibited during the at least one portion of the eMBMS stream.

2. The method as claimed in claim 1, further comprising exhibiting the at least one content based on at least one of a gaze and a behaviour of the user detected by the user device.

3. The method as claimed in claim 1, wherein the tagging of the at least one content with the at least one object is one of a pre-tagging and a real-time tagging.

4. The method as claimed in claim 1, wherein the at least one portion of the eMBMS stream is expressed in time of occurrence in the eMBMS stream.

5. The method as claimed in claim 1, wherein at least one of an advertisement and a direct link are exhibited using one of an indication, a dialogue box, a banner, a pop-up, and a textual message.

6. The method as claimed in claim 1, wherein the eMBMS stream includes at least one of a pre-stored video stream and a live stream.

7. The method as claimed in claim 1, wherein the profile information includes at least one of a name of the user, a geographic location information of the user, a date of birth of the user, a preference of the user, a gender of the user.

8. The method as claimed in claim 1, wherein the at least one object includes at least one of an attire worn by a character, an article, and a location displayed during the at least one portion of the eMBMS stream.

9. A method of providing at least one content in an eMBMS stream to a user device, the method being performed by the user device, the method comprising:
transmitting a request from a user device to a server for availing an evolved multimedia broadcast multicast services (eMBMS) stream, wherein the eMBMS stream has at least one stream portion;
generating at least one context tag based on a profile information, wherein the profile information corresponds to a user;
transmitting at least one of the at least one context tag and the profile information to the server;
receiving the at least one content from the server, wherein
the at least one content is identified based on at least one of the at least one context tag and the profile information,
the at least one content is tagged with the at least one object,
the at least one object corresponds to at least one portion of the eMBMS stream;
the at least one content includes an advertisement corresponding to the at least one object and a direct link to purchase an item corresponding to the at least one object and the direct link is configured to allow purchase of the item while streaming the eMBMS stream by causing one or more of a retailer portal, a pre-installed application, or a macro application to open to allow for purchase and payment of the item; and
exhibiting the at least one content, wherein the at least one content is exhibited during the at least one portion of the eMBMS stream.

10. The method as claimed in claim 9, further comprising exhibiting the at least one content based on at least one of a gaze and a behaviour of the user detected by the user device.

11. The method as claimed in claim 9, wherein the tagging of the at least one content with the at least one object is one of a pre-tagging and a real-time tagging.

12. The method as claimed in claim 9, wherein the at least one portion of the eMBMS stream is expressed in time of occurrence in the eMBMS stream.

13. The method as claimed in claim 9, wherein at least one of an advertisement and a direct link are exhibited using one of an indication, a dialogue box, a banner, a pop-up, and a textual message.

14. The method as claimed in claim 9, wherein the eMBMS stream includes at least one of a pre-stored video stream and a live stream.

15. The method as claimed in claim 9, wherein the profile information includes at least one of a name of the user, a geographic location information of the user, a date of birth of the user, a preference of the user, a gender of the user.

16. The method as claimed in claim 9, wherein the at least one object includes at least one of an attire worn by a character, an article, and a location displayed during the at least one portion of the eMBMS stream.

17. A server for providing at least one content in an eMBMS stream to a user device, the server comprising:
a receiver module configured to:
receive a request from a user device for availing an evolved multimedia broadcast multicast services (eMBMS) stream, wherein the eMBMS stream has at least one stream portion, and
receive a profile information from the user device, wherein the profile information corresponds to a user;
a media presentation description module configured to:
generate at least one context tag based on the profile information, and
screening the at least one portion of the eMBMS stream to identify at least one object,
wherein
the at least one content is tagged with the at least one object, and
the at least one object corresponds to at least one portion of the eMBMS stream; and
a transmitter module configured to:
transmit the at least one content based on at least one of the profile information and the at least one context tag wherein the at least one content includes an advertisement corresponding to the at least one object and a direct link to purchase an item corresponding to the at least one object and wherein further the direct link is configured to allow purchase of the item while streaming the eMBMS stream by causing one or more of a retailer portal, a pre-installed application, or a macro application to open to allow for purchase and payment of the item, and
enable the at the user device to exhibit the at least one content, wherein the at least one content is exhibited during the at least one portion of the eMBMS stream.

18. A user device for providing at least one content in an eMBMS stream to the user device, the user device comprising:
a transmitter module configured to:
transmit a request to a server for availing an evolved multimedia broadcast multicast services (eMBMS) stream, wherein the eMBMS stream has at least one stream portion;
an advertisement management module configured to:
generate at least one context tag based on a profile information, wherein
the profile information corresponds to a user, and
the transmitter module transmits the at least one of at least one context tag and the profile information to the server; and
a receiver module configured to:
receive the at least one content from the server based on at least one of the at least one context tag and the profile information, wherein
the at least one content is tagged with the at least one object,
the at least one object corresponds to at least one portion of the eMBMS stream,
the at least one content includes an advertisement corresponding to the at least one object and a direct link to purchase an item corresponding to the at least one object and further the direct link is configured to allow purchase of the item while streaming the eMBMS stream by causing one or more of a retailer portal, a pre-installed application, or a macro application to open to allow for purchase and payment of the item; and
wherein the advertisement management module exhibits the at least one content, wherein the at least one content is exhibited during the at least one portion of the eMBMS stream.

* * * * *